April 27, 1965

C. L. HUISMAN 3,180,511

APPARATUS FOR SUPPORTING AND MOUNTING MACHINERY

Filed April 8, 1963

INVENTOR
CHARLES L. HUISMAN
BY Rudolph L. Lowell
ATTORNEY

April 27, 1965 C. L. HUISMAN 3,180,511
APPARATUS FOR SUPPORTING AND MOUNTING MACHINERY
Filed April 8, 1963 4 Sheets-Sheet 2
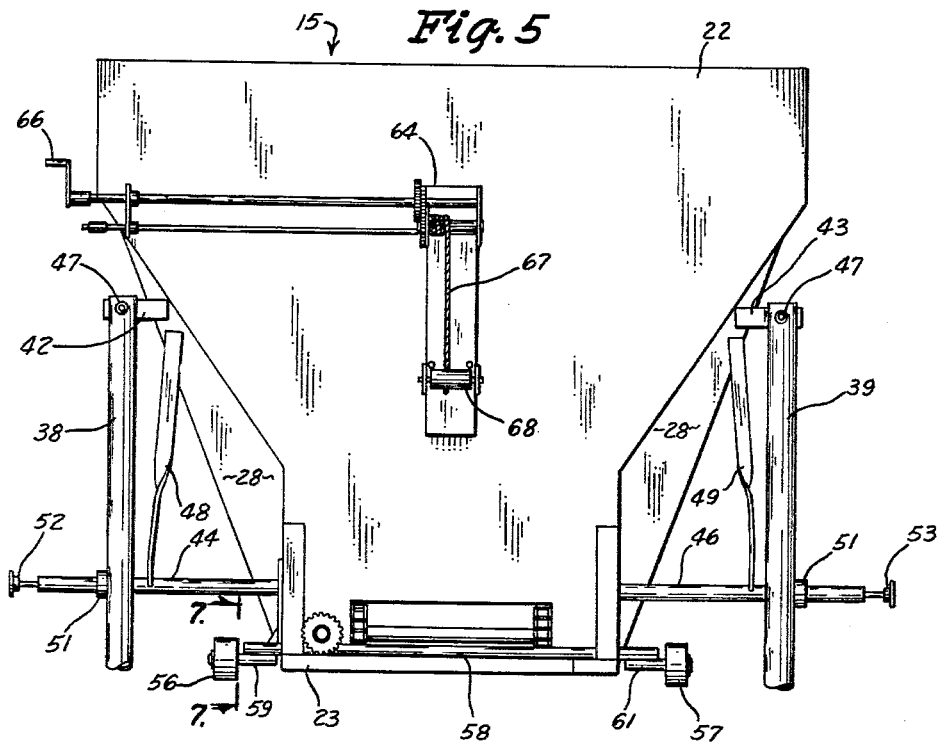
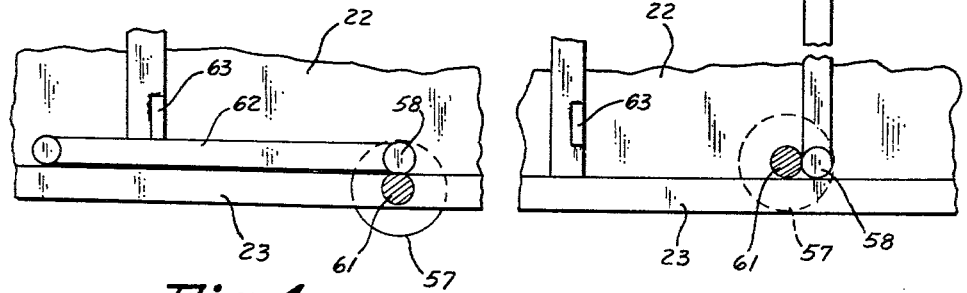
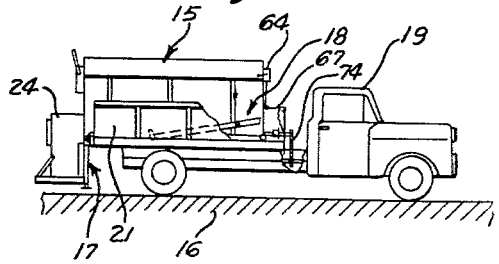
INVENTOR
CHARLES L. HUISMAN
BY Rudolph L. Lowell
ATTORNEY

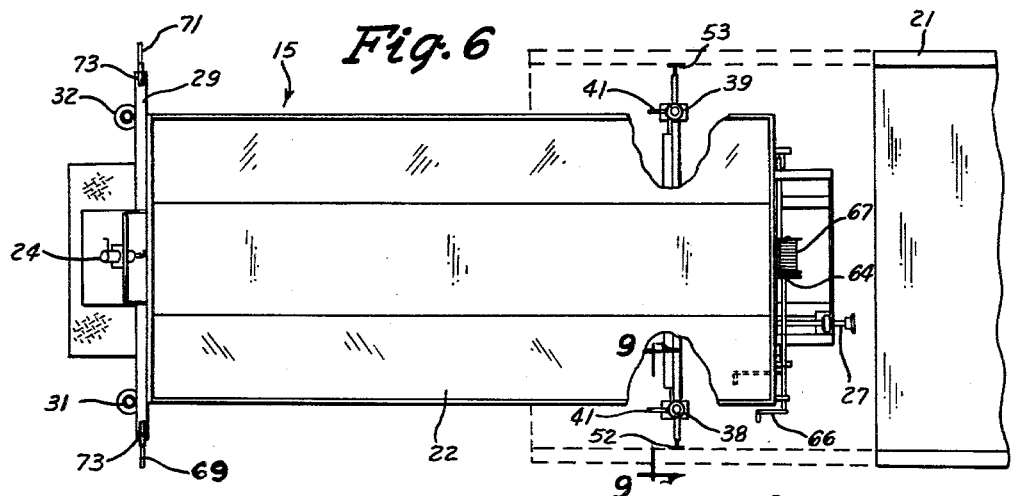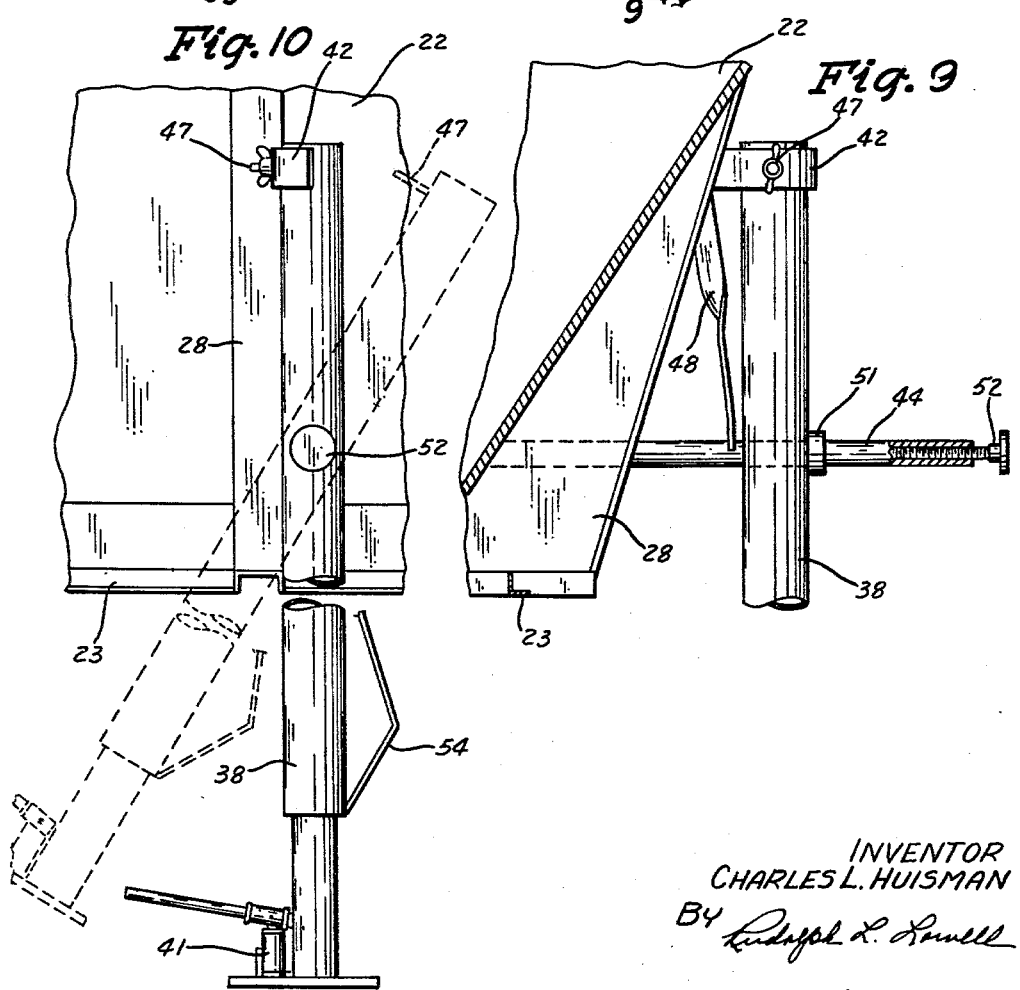

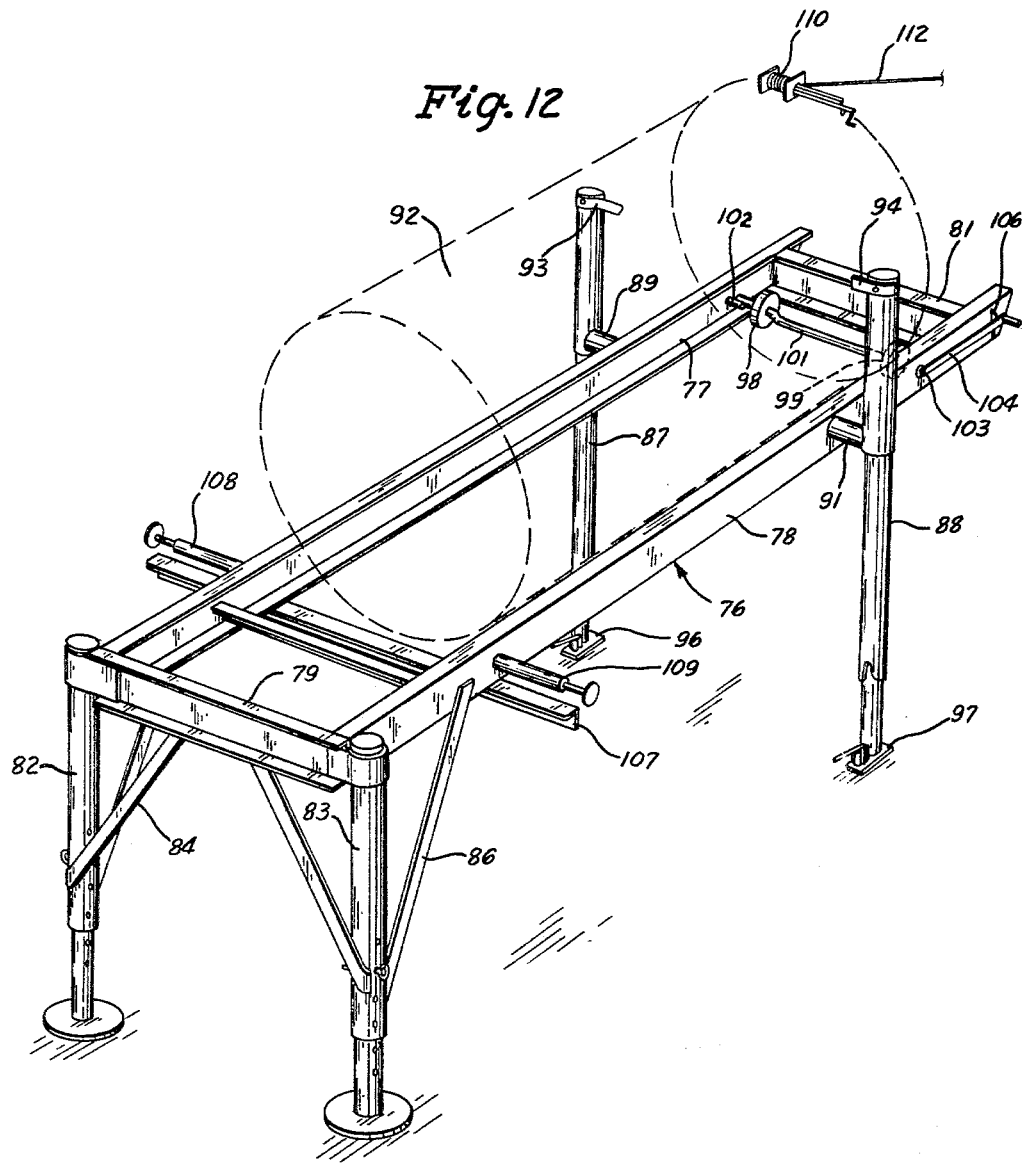

United States Patent Office 3,180,511
Patented Apr. 27, 1965

3,180,511
APPARATUS FOR SUPPORTING AND
MOUNTING MACHINERY
Charles L. Huisman, 1304 Curtiss Ave., Ames, Iowa
Filed Apr. 8, 1963, Ser. No. 271,184
4 Claims. (Cl. 214—515)

This invention relates to ground supported apparatus for maintaining machinery at an elevated position and operable to load and unload the machinery on and from the body of a vehicle. The apparatus of the invention consists of means for supporting machinery above the ground independently of the body of a truck and enabling the machinery to be moved onto a truck body.

It is the object of the present invention to provide an improved machinery support apparatus which enables the machinery to be placed within and secured to a vehicle box or body, without the necessity of using external lifting and holding equipment, and to be removed from the vehicle box under the same circumstances.

Another object of the invention is to provide a frame apparatus for portable equipment which reduces the time and effort required to load and unload the equipment from a vehicle body thereby minimizing the time the vehicle is not in use.

A further object of the invention is to provide an apparatus for mounting portable equipment within a standard vehicle which does not require modification of the vehicle box.

Another object of the invention is to provide a ground supported apparatus for machinery which facilitates the loading of the machinery on a standard truck box and is positionable within the transverse confines of the box.

Still another object of the invention is to provide apparatus for independently supporting equipment above the surface of the ground to facilitate the removal of the vehicle upon which the equipment is carried from under the equipment.

An additional object of the invention is to provide a safe and rugged supporting apparatus for portable equipment which is sturdy and economical in construction and efficient and reliable in use.

FIG. 4 is a diagrammatic view similar to FIG. 1 showing the material spreading equipment loaded within the box of a truck;

FIG. 5 is an enlarged elevational view of the front end of the material spreading equipment and support apparatus therefor shown in FIG. 2;

FIG. 6 is a plan view of the material spreading equipment in alignment with a vehicle box with parts of the equipment broken away to illustrate the support apparatus of the invention;

FIG. 7 is an enlarged detail sectional view taken along line 7—7 of FIG. 5 showing the roller means in a lowered position;

FIG. 8 is a view illustrated similar to FIG. 7 showing the roller means in a raised or retracted position;

FIG. 9 is an enlarged sectional view taken along the line 9—9 of FIG. 6;

FIG. 10 is an enlarged fragmentary side view of the material spreading equipment and support apparatus therefor showing the pivoted front leg means of the apparatus;

FIG. 12 is a perspective view of a modified support apparatus which facilitates the loading and unloading of portable equipment on and from the box of a vehicle.

Figure 1:
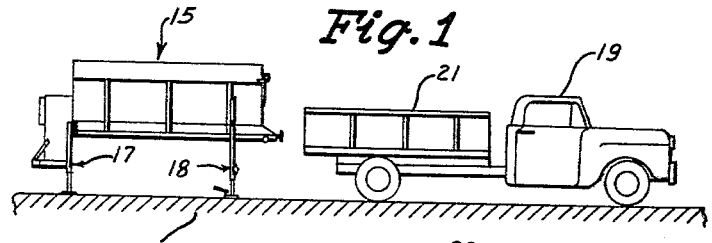
FIG. 1 is a diagrammatic view showing a truck about to be driven into operative position with respect to material spreading equipment supported above the ground by the apparatus of the present invention.

Referring to the drawing, there is shown in FIG. 1 a machine 15, such as bulk material spreading equipment, positioned above the ground 16 by telescoping rear support means 17 and front support means 18. A vehicle 19, shown as a truck, having a body or box 21 is parked adjacent the front of the machine 15. The tail gate (not shown) of the body 21 has been removed so that the vehicle can be backed under the machine 15 as hereinafter described in detail.

Figure 3:
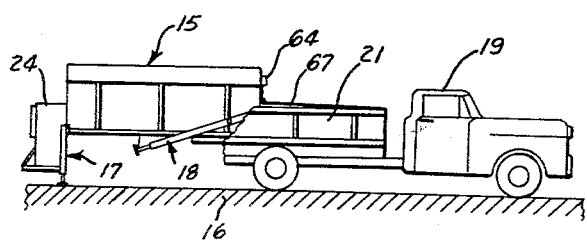
FIG. 3 is a diagrammatic view similar to FIG. 1 showing the material spreading equipment partially loaded within the box of a truck.

As shown in FIG. 3, the vehicle 19 is driven in a reverse direction to move the box 21 thereof under the machine 15. After the front end of the machine rests upon the bed of the box 21 the front support means 18 are pivoted about a horizontal axis thereby permitting the machine 15 to be moved within the box 21. When the machine 15 is in the loaded position on the vehicle box 21, as shown in FIG. 4, the front support means 18 are positioned within the body and the rear support means 17 are retracted out of engagement with the ground 16 and project downwardly adjacent the rear edge of the vehicle box 21.

Figure 2:
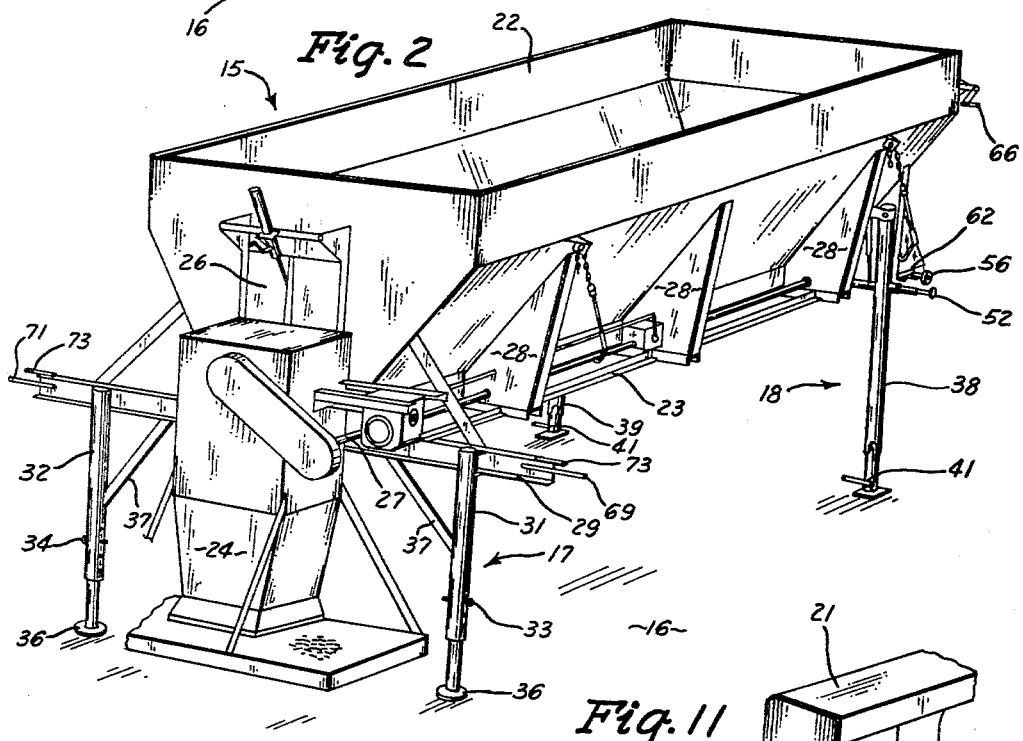
FIG. 2 is an enlarged perspective view of the material spreading equipment and support apparatus therefor of FIG. 1.

Referring to FIG. 2, the machine 15 is illustrated as bulk material spreading equipment and comprises an inverted V-shaped box 22 mounted on a longitudinally extended base frame 23. A material spreading mechanism 24 is secured to the rear end of the box 22 and receives a supply of bulk material from the box through a vertically adjustable gate 26. The material spreading mechanism 24 extends below the box 22 and is connected in a driven relation with the drive shaft (not shown) of the vehicle 19 by means of a power shaft 27. Gusset plates 28 extend upwardly from the frame 23 and are secured to the sides of the box 22 to support the box 22 in an upright position.

The rear support means 17 is connected to the rear of the frame 23 by a transverse extended channel beam 29 and constitutes a pair of downwardly extended legs 31 and 32 which are secured to the opposite end sections of the channel beam 29. The legs 31 and 32 include telescopic tubular members which are interconnected by means of transverse pins 33 and 34 respectively. A flat disc 36 is secured to the lower end of each leg 31 and 32 and forms a supporting shoe which engages the surface of the ground 16. The legs 31 and 32 are stabilized in an upright position by braces 37 which extend upwardly at an angle and connect the mid-section of each leg with a portion of the frame 23 and transverse channel beam 29.

The front support means 18 comprises a pair of downwardly extended legs 38 and 39. Secured to the lower end of each leg 38 and 39 respectively is a hydraulic jack 41 which is operable to extend and retract the length of the leg thereby raising or lowering the front end of the machine 15.

As shown in FIG. 5, the legs 38 and 39 are connected to the box 22 and the frame 23 by means of curved brackets 42 and 43 and laterally projected axles 44 and 46. The upper end of each leg is releasably connected to its corresponding bracket 42 and 43 by means of a nut and bolt assembly 47. The axles 44 and 46 are held in a horizontal position by twisted braces 48 and 49, respectively, which are secured at their lower ends to the respective axles 44 and 46 and at their upper ends to the gusset plates 28. The axles 44 and 46 extend diametrically through their respective legs 38 and 39 thereby pivotally mounting the legs 38 and 39 on the vehicle 15 for rotational movement about a horizontal axis which extends transversely of the machine. The respective legs are retained upon their axles by collars 51 which are concentrically mounted on the axle adjacent the legs and retained there by set screws (not shown).

Extended axially outwardly from the ends of the axles 44 and 46 are adjustable spacer members 52 and 53. As shown in FIG. 9, the spacer member 52 is threaded axially into the end of the axle 44 and is rotatable to adjust the length of the axle. As shown in FIG. 10, when the nut and bolt assembly 47 is released, the leg 38 may be rotated in a clockwise direction as indicated by the broken line position. The front legs 38 and 39 are rotated to a horizontal position when the box 21 of the vehicle is moved under the machine 15. In this position the jack 41 is held above the bed of the box 21 by an angular strap 54 secured to the forward side of the leg adjacent the jack 41. The strap 54 slides and rests on the bed of the box 21.

In order to reduce the amount of force required to load the machine onto the box 21 the front section of the machine is supported on a pair of rollers 56 and 57. As shown in FIG. 5, a transverse shaft 58 is rotatably mounted adjacent the forward end of the frame 23. The rollers 56 and 57 are eccentrically secured to the outer ends of the shaft 58 by means of stub shafts 59 and 61, respectively. An arm 62 extends radially from and is secured at one end to the shaft 58 adjacent the outside wall frame 23. As shown in FIG. 7, when the arm 62 is moved to a horizontal position the shaft 58 is rotated moving the eccentrically mounted rollers 56 and 57 below the bottom surface of the frame 23 thereby supporting the front end of the machine 15 on the rollers 56 and 57. The arm 62 is resilient and when moved to a horizontal position snaps over a catch 63 secured to the side of the frame 23. The top edge of the arm 62 engages the lower surface of the catch 63 thereby preventing reverse movement of the arm 62. As shown in FIG. 8, when the arm 62 is released from the catch 63 and moved to an upright position the shaft 58 is rotated to move the rollers 56 and 57 in an upward direction above the bottom surface of the frame 23. In this position the frame 23 rests directly on the bed of the box or body 21.

As shown in FIGS. 5 and 6, a hand operated winch 64 having a crank handle 66 and cable 67 is mounted on the forward wall of the box 22. The cable extends downwardly from the winch 64 over a roller 68 rotatably mounted on the forward wall of the box 22 below the winch 64. The cable 67 is of a predetermined length which is shorter than the length of the body 21 so that when the cable is fully unwound from the winch 64 the end of the frame 23 will be on the vehicle box 21. This is a safety feature which prevents the accidental separation of the machine 15 from the vehicle 19.

Figure 11:
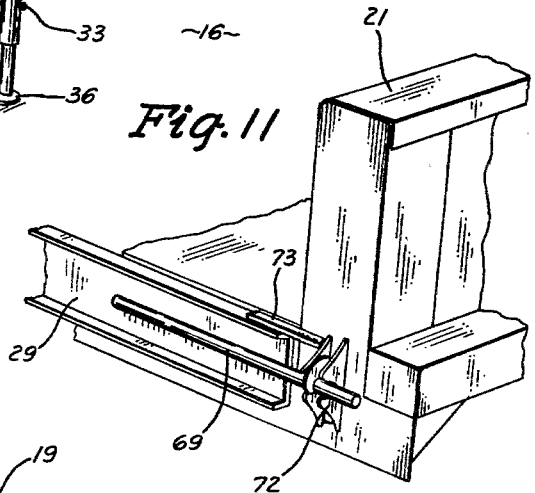
FIG. 11 is an enlarged fragmentary detail perspective view of the locking connection between the support apparatus for the material spreading equipment and the box of the truck.

The rear section of the machine 15 is provided with lateral rod members 69 and 71 which are secured to the opposite ends of the channel beam 29 (see FIGS. 2 and 6). As shown in FIG. 11, when the machine 15 is in the loaded position the channel beam 29 abuts the rear end of the bed of the vehicle box 21. The rod member 69 fits into the tail gate locking hinge 72 thereby fastening the beam 29 to the box 21. Bolt means (not shown) may be used to connect the channel beam 29 directly to the end of the box 21. Each end of the channel beam 29 has a laterally projected plate 73 which abuts the tail gate locking hinge 72 thereby minimizing the lateral movement of the rear portion of the machine 15.

In use, when the machine 15 is to be loaded on the box 21 of the vehicle the upright legs 31, 32, 38 and 39 engage the ground 16 and hold the box 22 above the surface of the ground. The jacks 41 are operated to extend the front legs 38 and 39 thereby raising the front end of the machine above the level of the floor or bed of the box 21. The arm 62 is moved to its horizontal position under the catch 63 as shown in FIG. 7 to lower the rollers 56 and 57 below the level of the frame 23 of the machine.

The truck is driven in a reverse direction moving the box 21 thereof under the front section of the machine 15. The cable 67 of the winch 64 is extended and hooked to the front of the body 21 thereby preventing the accidental separation of the machine from the body. The weight of the front section of the machine 15 is transferred from the front legs 38 and 39 to the box 21 by operating the jacks 41 to shorten the respective legs thereby lowering the front of the machine onto the bed of the box 21. The nut and bolt assemblies 47 which secure the tops of the front legs 38 and 39 to the box 22 are released thereby permitting the legs 38 and 39 to be pivoted on their respective axles 44 and 46 as shown in FIG. 3.

The vehicle 19 is slowly reversed to move the body thereof under the machine 15 as shown in FIG. 4. Alternatively, the vehicle 19 may be pulled under the machine 15 by operation of the winch 64. When the machine 15 is in a loaded position the lateral rod members 59 and 71 are locked in the tail gate locking hinges 72 as shown in FIG. 11. The laterally projected plates 73 lie closely adjacent to the inside surfaces of the tail gate hinges thereby minimizing the amount of lateral movement of the rear section of the machine 15.

After the machine has been moved to the loaded position, the arm 62 is moved out from under the catch 63 thereby raising the rollers 56 and 57 permitting the longitudinally extended base frame 23 to lie flat on the bed of the box 21. The cable 67 of the winch 64 is retained in position to hold the machine in the loaded position along with the lateral rod members 69 and 71.

The spacer members 52 and 53 as shown in FIG. 5 are extended to engage the side walls of the box 21 thereby preventing any lateral movement of the front of the machine 15.

As shown in FIG. 4 a drive chain 74 connects the power shaft 27 of the machine with the drive shaft of the vehicle 19. After the rear legs 31 and 32 have been retracted by removing the pins 33 and 34 the lower sections of the legs are telescoped into the upper sections. The pins 33 and 34 are reinserted into the respective legs thereby holding the legs in a retracted position. The material spreading machine 15 is now loaded and ready for operation.

When it is desired to remove the machine 15 from the body 21 of the vehicle, the rear legs 31 and 32 are extended until they engage the surface of the ground 16 and the drive chain 74 is removed from the power shaft 27. The spacer members 52 and 53 are turned back out of engagement with the sides of the box 21. In order to reduce the friction between the bottom of the longitudinal frame 23 of the machine and the bed of the box 21, the rollers 56 and 57 are moved to their down position by forcing the arm 62 under the catch 63.

The winch 64 is now rotated in a reverse direction putting slack in the cable 67. The tail gate hinge 72 is released from the lateral rod members 69 and 71 thereby permitting the truck to be moved in a forward direction out from under the machine 15. As the vehicle moves forward the front legs 38 and 39 pivot about a horizontal axis on their respective axles 44 and 46 and move to an upright position. The legs 38 and 39 are fastened in the upright position by the nut and bolt assemblies 47. The front of the machine is raised off of the bed of the body 21 by operating the jacks 41. The vehicle 19 cannot be removed entirely from under the machine 15 until the cable 67 has been released from the body 21 by virtue of the limited length of the cable 67. After the cable 67 has been unhooked the machine 15 stands on the surface of the ground independent of the vehicle.

A modified form of the apparatus for supporting machinery which facilitates the loading and unloading of the machinery on and from the body of a vehicle is shown in FIG. 12. The apparatus comprises a longitudinally extended frame 76 which includes a pair of longitudinally extended beams 77 and 78 connected at each end by transverse beams 79 and 81. Secured to the rear end of the beams 77 and 78 are downwardly extended legs 82 and 83. Braces 84 and 86 hold the respective legs in an upright position. The legs 82 and 83 are telescoped members which can be extended and retracted to vary the length of the legs.

The front section of the frame 76 is supported above the surface of the ground by a pair of front legs 87 and 88. Lateral stub shafts 89 and 91 projected from each of the beams 77 and 78 pivotally mount the front legs 87 and 88 on the respective beams 77 and 78 for movement on a horizontal axis which extends transversely of the frame. The upper ends of the respective legs 87 and 88 are releasably secured to a portion of the equipment 92, shown in broken lines as a tank, which is positioned upon the longitudinal extended beams 77 and 78. The lower end of each of the front legs 87 and 88 is provided with a hydraulic jack 96 and 97, respectively, which operate to raise and lower the front end of the frame 76 by extending and contracting the respective legs.

In order to reduce the amount of force required to load the frame 76 onto the body of a truck, a pair of rollers 98 and 99 are rotatably mounted by means of a transverse shaft 101 positioned between the beams 77 and 78. The shaft 101 is rotatably mounted concentrically of its axis on the beams 77 and 78 by means of extensions 102 and 103 welded to the sides of the shaft 101. An arm 104 is secured to the extension 103. The arm 104 is moved into engagement with a catch 106 to hold the rollers 98 and 99 in a lowered position and moved in an upright position out of engagement with the catch 106 to raise the lower rollers 98 and 99.

The frame 76 is fastened to the rear of a vehicle box by means of an angle iron 107 which is secured to the bottom side of the beams 77 and 78 adjacent the rear end thereof and extends transversely of the beams. Bolts (not shown) project through the angle iron 107 and threadably engage the truck box.

In order to prevent lateral movement of the frame 76 when it is loaded on a vehicle box a pair of adjustable spacer bolts 108 and 109 are secured to the sides of the beams 77 and 78 and extend laterally outwardly therefrom. The spacer bolts 108 and 109 are extensible and retractable and function to engage the side walls of the vehicle box.

A winch 110 having a cable 112 is mounted on the forward section of the equipment 92 and is used to pull the frame 76 and the equipment mounted thereon onto the box of a vehicle.

While there have been shown, described, and pointed out the fundamental novel features of the invention as applied to the preferred embodiment, it is to be understood that various omissions, substitutions, changes in form, and details of the apparatus illustrated may be made by those skilled in the art, without departing from the spirit of the invention. It is intended to be limited only as indicated by the scope of the following claims.

I claim:

1. Ground engageable apparatus for supporting above the ground equipment having a base frame with a front section and a rear section and for positioning the equipment within a vehicle box having a bed, side walls and a front wall comprising:
   (a) first retractable and extensible leg means secured to said rear section and projected in a downward direction,
   (b) second leg means mounted on said front section for pivotal movement about a horizontal axis extended transversely of said equipment,
   (c) releasable locking means for holding said second leg means in a substantially downward direction,
   (d) jack means connected to the lower end of said second leg means operative to raise and lower said front section, and
   (e) roller means movably mounted on said front section forwardly of said second leg means for adjustment to a first position wherein the lower portion thereof is above the bottom side of said base frame and to a second position wherein said lower portion is below the bottom side of said base frame,
   (f) said front section, in the loading of said equipment in said vehicle box, being raised by said jack means to a height wherein said roller means, in the second position therefor, is above the level of said bed to provide for the movement of the bed thereunder so that on lowering of said front section by said jack means said roller means is supported on said bed whereby, on release of said locking means, the vehicle box is movable rearwardly relative to said equipment to locate the equipment within the box with said second leg means extended horizontally of the equipment within the confines of said side walls, said roller means then being movable to the first position therefor to provide for the base frame resting directly on said bed.

2. Ground engageable apparatus for supporting above the ground equipment having a base frame with a front section and a rear section and for loading and unloading the equipment within and from a vehicle box having a bed, side walls and a front wall,
   (a) a pair of retractable and extensible legs mounted on opposite sides of said rear section and projected in a downward direction,
   (b) a pair of legs pivotally mounted on opposite sides of said front section for pivotal movement about a horizontal axis extended transversely of said base frame,
   (c) releasable locking means for holding said pivoted legs in a substantially downward direction,
   (d) a pair of jack means corresponding to said pivoted legs and connected to the lower ends thereof and operative to raise and lower said front section,
   (e) roller means rotatably mounted on said front section forwardly of said pivoted legs, and
   (f) means for adjustably moving said roller means to a first position wherein the lower portion thereof is below the bottom side of the base frame, and to a second position wherein said lower portion is above the bottom side of said base frame,
   (g) said roller means being in the second position therefore when the equipment is within said vehicle box to provide for the base frame resting directly on said bed and movable to the first position therefor during the loading and unloading of said equipment for rolling engagement with said bed, said jack means in the loading of said equipment being first operated to raise said front section above the level of said bed to provide for the positioning of the roller means above the rear end portion of the bed and then operated to transfer the support of said front section from said pivoted legs to said bed, and in the unloading of said equipment, when said front section is supported on the rear end portion of said bed and said pivoted legs extended downwardly, being operated to transfer the support of said front section to said pivoted legs.

3. The invention defined in claim 2 including:
   (h) means releasably connectable between the equipment and the box for limiting the travel of said roller means within the longitudinal confines of said bed when said roller means is in rolling engagement with said bed.

4. Ground engageable apparatus for supporting above the ground equipment having a base frame with a front section and a rear section and for loading and unloading the equipment within and from a vehicle box having a bed, side walls and a front wall, (a) a pair of retractable and extensible legs mounted on opposite sides of said rear section and projected in a downward direction,
(b) a pair of legs pivotally mounted on opposite sides of said front section for pivotal movement about a horizontal axis extended transversely of said base frame, said pivoted legs being spaced apart a distance less than the distance between said side walls,
(c) locking means for releasably holding said pivoted legs in a substantially downward direction,
(d) a pair of jack means corresponding to said pivoted legs and connected to the lower ends thereof and operative to raise and lower said front section,
(e) roller means rotatably mounted on said front section forwardly of said pivoted legs, and
(f) means for adjustably moving said roller means to a first position wherein the lower portion thereof is below the bottom side of the base frame, and to a second position wherein said lower portion is above the bottom side of said base frame,
(g) said roller means being in the second position therefor when the equipment is within said vehicle box to provide for the base frame resting directly on said bed and movable to the first position therefor during the loading and unloading of said equipment for rolling engagement with said bed, said jack means in the loading of said equipment being first operated to raise said front section above said bed to provide for the positioning of the rear end portion of said bed thereunder and then operated to lower said front section to transfer the support of the front section from said pivoted legs to the bed whereby, on release of said locking means and movement of the equipment within the box, said pivoted legs are engageable with the bed and moved to horizontally extended positions within the confines of said side walls.

References Cited by the Examiner

UNITED STATES PATENTS

| | | | |
|---|---|---|---|
| 1,838,472 | 12/31 | Barrett. | |
| 2,808,164 | 10/57 | Glendinning | 214—517 |
| 2,881,024 | 4/59 | Saiberlich | 296—35.1 |
| 3,044,800 | 7/62 | Wicker | 296—24 |
| 3,073,467 | 1/63 | Parks | 214—515 |
| 3,112,836 | 12/63 | Back | 214—515 |

FOREIGN PATENTS 93,476  6/57  Netherlands.

HUGO O. SCHULZ, *Primary Examiner.*
GERALD M. FORLENZA, *Examiner.*